(12) United States Patent
Ramaswamy et al.

(10) Patent No.: US 7,533,364 B2
(45) Date of Patent: May 12, 2009

(54) METHOD AND SYSTEM FOR ANALYZING INTERACTION AMONG SOFTWARE ARTIFACTS

(75) Inventors: Srinivasan Ramaswamy, Chennai (IN); Krishnamoorthy Meenakshisundaram, Chennai (IN); Raghuram Devalla, Chennai (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 447 days.

(21) Appl. No.: 11/060,204

(22) Filed: Feb. 17, 2005

(65) Prior Publication Data
US 2005/0203955 A1 Sep. 15, 2005

Related U.S. Application Data

(60) Provisional application No. 60/553,233, filed on Mar. 15, 2004.

(51) Int. Cl.
*G06F 9/44* (2006.01)
*G06F 7/00* (2006.01)
(52) U.S. Cl. .............. 717/103; 717/106; 707/101.4
(58) Field of Classification Search .......... 717/101, 717/103, 105, 106, 124; 707/101.4
See application file for complete search history.

(56) References Cited

U.S. PATENT DOCUMENTS

| | | | |
|---|---|---|---|
| 5,396,627 A | | 3/1995 | Iitsuka |
| 5,450,586 A * | | 9/1995 | Kuzara et al. ............... 717/124 |
| 5,485,616 A | | 1/1996 | Burke et al. |
| 5,671,419 A | | 9/1997 | Carini et al. |
| 6,578,090 B1 * | | 6/2003 | Motoyama et al. .......... 719/315 |
| 6,665,685 B1 * | | 12/2003 | Bialic ........................ 707/102 |
| 7,174,348 B1 * | | 2/2007 | Sadhu et al. ............. 707/104.1 |
| 2002/0184250 A1 * | | 12/2002 | Kern et al. ................... 707/204 |
| 2004/0193652 A1 * | | 9/2004 | Wendker et al. ......... 707/104.1 |
| 2005/0027559 A1 * | | 2/2005 | Rajan et al. ..................... 705/1 |
| 2005/0240911 A1 * | | 10/2005 | Hundley et al. ............. 717/142 |
| 2006/0090154 A1 * | | 4/2006 | Bustelo et al. .............. 717/110 |
| 2007/0038610 A1 * | | 2/2007 | Omoigui ........................ 707/3 |

OTHER PUBLICATIONS

A Step-by-Step Design and Development of an Integrated Educational Software to Deal with Students' Empirical Ideas about Mechanical Interaction, Kolokotronis et al., vol. 8, Issue 3, 2003, ACM Portal, pp. 229-244.*

(Continued)

*Primary Examiner*—Wei Y Zhen
*Assistant Examiner*—Satish Rampuria
(74) *Attorney, Agent, or Firm*—Prakash Nama; Global IP Services, PLLC

(57) ABSTRACT

A system and method to analyze interactions among software artifacts within enterprise applications. The system includes an artifact analyzer module an artifact code parsing module and an artifact token processing module. The artifact analyzer module generates artifact tokens associated with trigger points in which processing control passes between a first software object and a second software object in the enterprise application and an interaction token repository for storing artifact tokens. The artifact tokens describe identity of the first software object, ownership of the first software object containing the trigger point, a location within first software object of the trigger point, and identity of the second software object. These artifact tokens are stored within an interaction token repository for later use.

22 Claims, 6 Drawing Sheets

OTHER PUBLICATIONS

Requirements for a layered software architecture supporting cooperative multi-user interaction, Pavoli et al., 1996, IEEE, pp. 408-417.*

A method for detecting and eliminating feature interactions using a frame model, Nakamura, M.; Tsuboi, Y.; IEEE, 1995, vol. 1, pp. 99-103.*

Safety analysis of an evolving software architecture, de Lemos, R.; IEEE, 2000, pp. 159-168.*

Analyzing interaction ordering with model checking, Dwyer, M.B.; Robby; Tkachuk, O.; Visser, W.; IEEE, 2004, pp. 1-10.*

A scenario-based reliability analysis appoach for component-based software, Yacoub, S.; Cukic, B.; Ammar, H.H.; IEEE, 2004, vol. 53 Issue: 4, pp. 465-480.*

* cited by examiner

METHOD AND SYSTEM FOR ANALYZING INTERACTION AMONG SOFTWARE ARTIFACTS

RELATED APPLICATIONS

Benefit is claimed under 35 U.S.C. 119(e) to U.S. Provisional Application Ser. No. 60/553,233, entitled "A TECHNIQUE FOR ANALYZING INTERACTION AMONG SOFTWARE ARTIFACTS" by inventor Srinivasan Ramaswamy et al., filed Mar. 15, 2004, which is herein incorporated in its entirety by reference for all purposes.

FIELD OF THE INVENTION

Embodiments of the present invention relates generally to the technical field of software development and, in one exemplary embodiment, to methods and systems to analyze interactions among software artifacts.

BACKGROUND

A large enterprise application comprises of a number of interacting software artifacts which tend to have a high degree of cohesion. This interaction could be at different layers depending on the technical implementation architecture. Two cases of typical architectures which are used currently include client server and multi-tier architecture.

In a client-server architecture, the interaction can be at either the client layer or at the server layer. The server is typically a relational database system holding persistent data and the client will typically be a graphical user interface (GUI) interface implemented in Visual Basic/VC++/Java™. In case of the multi-tier technical architecture, the interactions could be at the following layers: presentation layer, services layer, methods layer, and database layer.

This leads to a large number of side effects when certain software artifacts have been modified. These need to be studied for the impact of changes. For example, if a control is added to a user interface it will lead to a change in the interface of a service. This will trigger changes in one or more methods having to change their interface signature. If these methods and services were reused in other places, the changes to the interfaces can lead to inconsistency. If such a study of impact is needed, information about the interactions of the software artifacts comprising of the enterprise application is generally needed. It is extremely unlikely that the software systems are developed with such an interaction mechanism being available as part of the development. This makes it difficult to completely study the impact of changes and be dependant on unstructured information for making such decisions.

SUMMARY

The below described embodiments of the present invention are directed to methods and systems to analyze interactions among software artifacts. According to one embodiment, there is provided a system for analyzing interactions among software artifacts within enterprise applications. The system includes an artifact analyzer module for generating artifact tokens associated with trigger points in which processing control passes between a first software object and a second software object in the enterprise application and an interaction token repository for storing artifact tokens. The artifact analyzer module includes an artifact code parsing module and an artifact token processing module. The artifact tokens describe identity of the first software object, ownership of the first software object containing the trigger point, a location within first software object of the trigger point, and identity of the second software object.

In another embodiment, there is provided a method for analyzing interactions among software artifacts within enterprise applications. The method assigns an ownership function for every software object within the enterprise application, parses software code for software objects in the enterprise application, extracts artifact tokens associated with trigger points in which processing control passes between a first software object and a second software object in the enterprise application, and analyzes interaction between the first and second software object using the artifact tokens. The artifact tokens describe identity of the first software object, ownership of the first software object containing the trigger point, a location within first software object of the trigger point, and identity of the second software object.

In yet another embodiment, there is provided a machine-readable medium storing a set on instructions that, when executed by a machine, cause of the machine to perform a method for analyzing interactions among software artifacts within enterprise applications. The method receives the software from a software development system for processing and analysis of artifact token data, assigns an ownership function for every software object within the enterprise application, parses software code for software objects in the enterprise application, extracts artifact tokens associated with trigger points in which processing control passes between a first software object and a second software object in the enterprise application, stores artifact tokens within an interaction artifact repository, and analyzes interaction between the first and second software object using the artifact tokens. The artifact tokens describe identity of the first software object, ownership of the first software object containing the trigger point, a location within first software object of the trigger point, and identity of the second software object.

The details of one or more embodiments of the invention are set forth in the accompanying drawings and the description below. Other features, objects, and advantages of the invention will be apparent from the description and drawings, and from the claims.

DETAILED DESCRIPTION

A method and system to analyze interactions among software artifacts are described. In the following description, for purposes of explanation, numerous specific details are set forth in order to provide a thorough understanding of the present invention. It will be evident, however, to one skilled in the art that the present invention may be practiced without these specific details.

Figure 1:
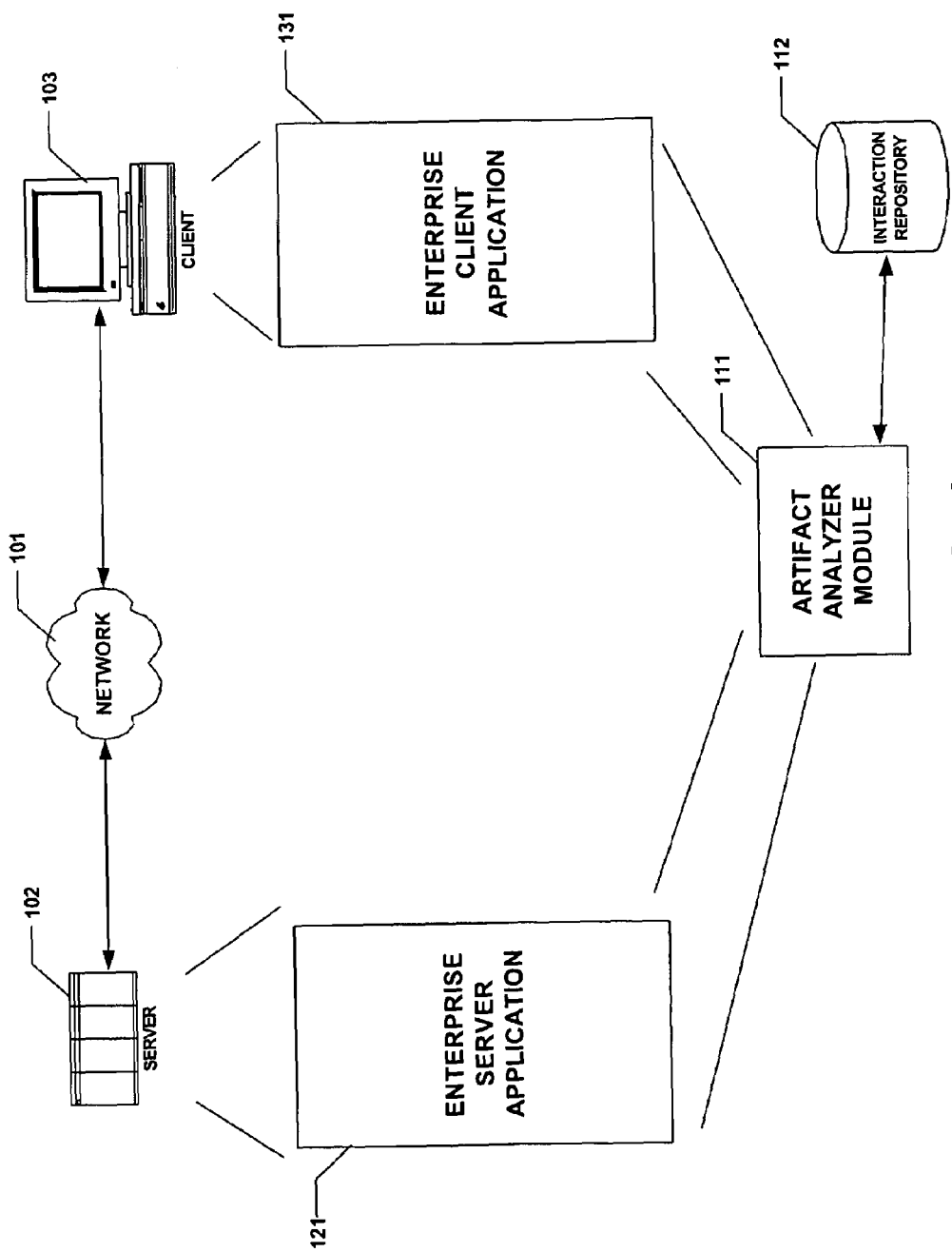
FIG. 1 is a network diagram depicting a system having a client-server architecture in accordance with one exemplary embodiment of the present invention.

FIG. 1 is a network diagram depicting a system having a client-server architecture in accordance with one exemplary embodiment of the present invention. Enterprise business applications are divided into an enterprise server application 121 that executes on a large server processing system 102 and an enterprise client application 131 that executes on one or more client processing systems 103. The enterprise server application 121 and the enterprise client application 131 communicate with each other over a network 102, such as a local area network or the Internet.

During the operation of the enterprise business application, a number of business functions interact with each other to provide value to an organization. These functions may be part of the enterprise server application 121 or part of the enterprise client application 131. Understanding the interactions between these business functions assists application developers in the creation, debugging, and operation of the enterprise business applications. These interactions between business functions include both interactions between business functions that are completely within either the enterprise server application 121 or the enterprise client application 131 and interactions that are between business functions on both the enterprise server application 121 and the enterprise client application 131. These interactions between business functions are implemented as interaction of software artifacts implementing these functions.

An artifact analyzer module 111 may be used to extract interactions of software artifacts at different levels. This artifact analyzer module 111 provides a comprehensive repository 112 of the interaction found at all levels of the enterprise server application 121 and the enterprise client application 131. This repository 112 may be used for analyzing the changes to existing functionality within various applications as well as the impact of such changes on existing software of two architectures which are a client-server and multi-tier architecture.

In a client-server architecture, the server application 121 may be a relational database application holding persistent data and the client application 131 correspondingly may be a graphical user interface (GUI) implemented in Visual Basic/VC++/Java™.

When the artifact analyzer module processes enterprise applications, every object of the system may be assigned an owner function. The granularity of the owner function may be at any level. Depending on the granularity of the owner function, the artifact analyzer module 111 may determine all artifact interactions present at this level. For example, the artifact analyzer 111 may be set to assign ownership to a set of objects to a purchasing function within the server application 121. Alternatively, the artifact analyzer module 111 may assign ownership to the same set of objects to more granular function like purchase requesting, purchase ordering, goods receipt and so on. Depending on this granularity, the artifact analyzer module 111 may extract interaction at the specified granularity.

Parsers have been written to parse the elements of the code of both the client layer code and the server side code. The parser extracts the different tokens of the software and stores in a relational database model in the interaction repository 112. These tokens are collected for every user action. These tokens are analyzed to collect trigger points that lead to a transfer of control to different objects. This analysis uses the grammar associated with that particular programming language. All such Interaction points along with the destination object that services the transfer of control is stored in a relational model. The combination of object ownership along with the transfer trigger points is now used to arrive at the interaction model. This interaction model is now arranged in a way that we can navigate through the different functions that are cooperating to provide the required response for every user action.

Figure 2:
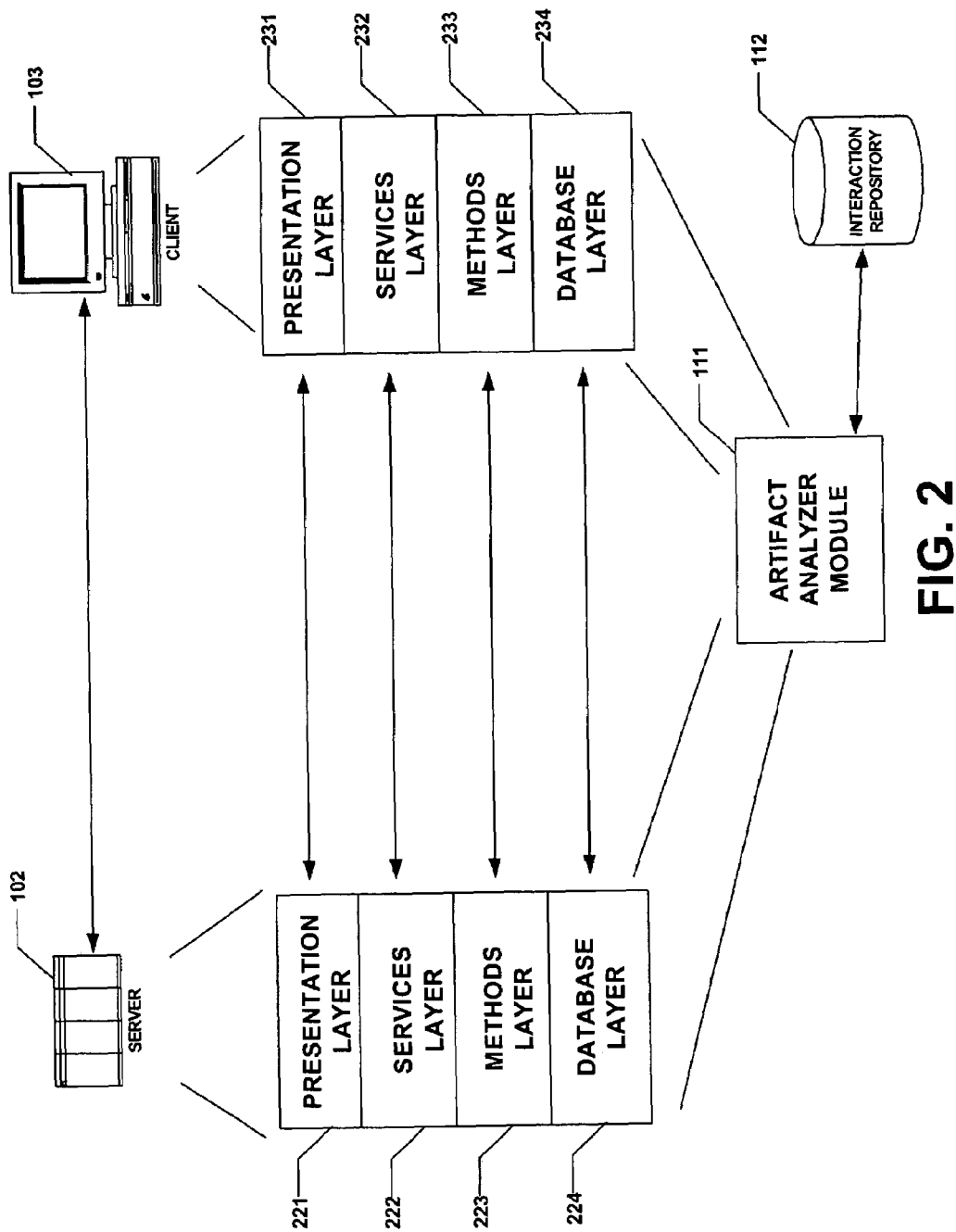
FIG. 2 is a network diagram depicting a system having a multi-layered application within a multi tier architecture in accordance with one exemplary embodiment of the present invention.

FIG. 2 is a network diagram depicting a system having a multi-layered application within a client-server architecture in accordance with one exemplary embodiment of the present invention. In a multi-tier architecture, there is an additional complexity that needs to be taken care of. The transfer of control happens at different layers. There is a need to keep track of the layer at which this transfer occurs for each user interaction. This information is stored in a relational model and is used for further analysis. The analysis is similar to a client server methodology of FIG. 1 but it generates the interactions at different layers explicitly.

In this alternate embodiment, artifact analyzer module 111 parse code for modules executing on both server 102 and client 103 to identify artifacts. In the multi-layer architecture of these applications, applications on server 102 are divided into corresponding layers: a server services layer 222, a server methods layer 223 and a server database layer 224. These various layers of the server application typically interact with corresponding layers on the client 103 that include: a client presentation layer 231, a client services layer 232, a client methods layer 233 and a client database layer 234. Software modules within each of these layers on both the client 103 and the server 102 interact with corresponding modules on the other computing platform as well as other layers within the same platform. Artifact analyzer module 111 parses the code associated with software modules within these layers to identify artifacts passing between layers and between processing systems in a manner similar to the processing of FIG. 1. These artifacts are maintained within a artifact repository 112 for later use.

Figure 3:
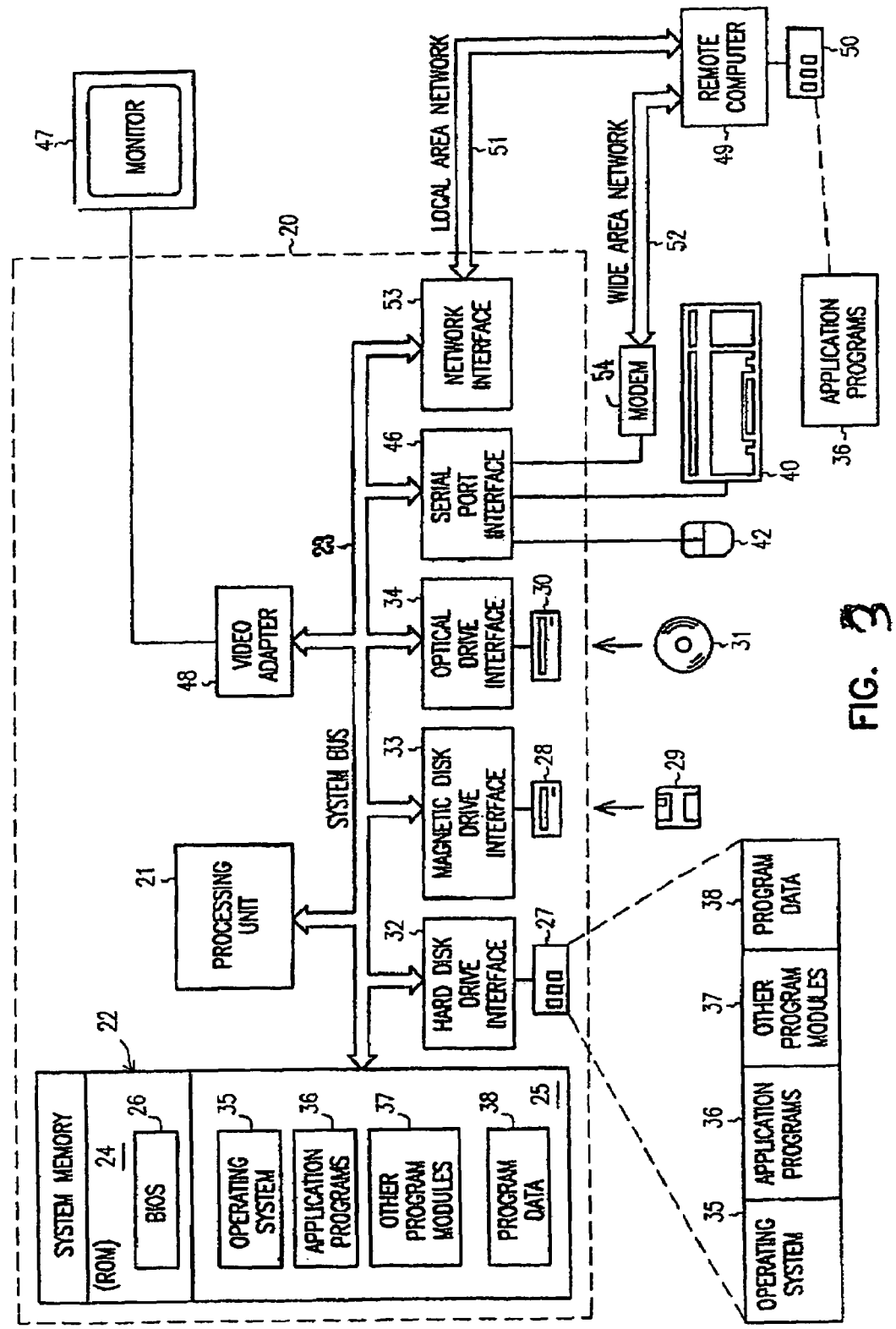
FIG. 3 is a block diagram illustrating a general programmable processing system for use in programmable processing system in accordance with various embodiments of the present invention.

FIG. 3 is an overview diagram of a hardware and an operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROM(s), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

Figure 4:
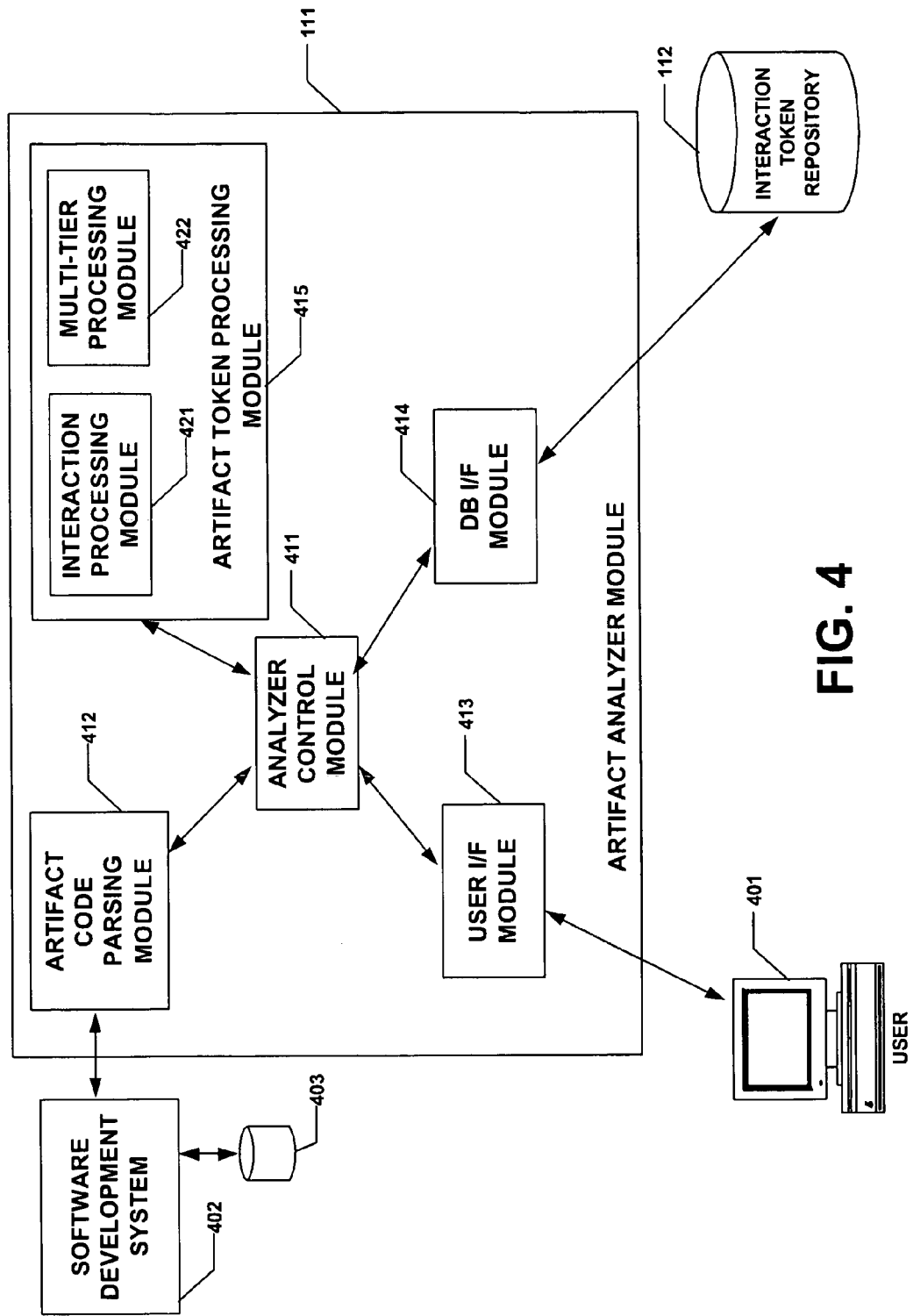
FIG. 4 is a block diagram of a software artifact analyzer module in accordance with an example embodiment of the present invention.

FIG. 4 is a block diagram of a software artifact analyzer module in accordance with an example embodiment of the present invention. Artifact analyzer module 111 contains a set of processing modules to perform its functions. These modules include an analyzer control module 411, an artifact code parsing module 412, a user interface module 413, a database interface module 414, and an artifact token processing module 415. The analyzer control module 411 controls the overall operation of the artifact analyzer module 111 to initiate operations to analyze software, interact with users and store and maintain artifact token data.

The artifact code parsing module 412 parses software module to identify artifact tokens within these modules that may be of interest in analyzing the operation of these modules. The artifact code parsing module 412 receives the code from a software development system 402 that typically stores the code, in source code form, in a software module database 403. In the embodiment of FIG. 4, the software development system 402 is illustrated as an external processing system. However, one skilled in the art will recognize that the artifact analyzer module 111 itself may be hosted within a larger software development system that may access source code developed and maintained therein without deviating from the scope of the present invention as recited within the attached claims.

The user interface module 413 provides a mechanism for a user to interact with the artifact analyzer module 111 to provide commands to initiate artifact token generation, to view and analyze generated artifact tokens, and to manipulate artifact data as part of any software development and analysis activity. In the embodiment of FIG. 4, user 401 interacts with the analyzer module 111 through a direct connection to the user interface module 413. One skilled in the art will recognize that any communication mechanism including network connections, remote connections, and direct connections between user 401 and the module 111 may be used without deviating from the scope of the present invention.

The database interface module 414 provides an interface between the artifact analyzer module 111 and the artifact interaction repository 112. The repository 112 is a database of all found artifact tokens used to define interactions between software modules within applications. These software modules include modules within server application 121, client application 131, as well as within the various layers within the server 221-224 and the various layers within the client 231-234. The database interface module 414 provides processing functions to store, search and retrieve tokens from the repository 112 during the operation of the artifact analyzer module 111.

The artifact token processing module 415 performs the functions associated with processing parsed code received from the artifact parsing module 412 to identify and characterize tokens found in parsing the code. This token processing module 415 defines the parameters identifying the token including the module generating the token, the module receiving the token and any data parameters used as part of the token. The token generated within the artifact token processing module 415 are stored within the artifact repository 112 through the database interface module 414. The artifact token processing module 415 may retrieve tokens from the repository as needed to assist in defining any new tokens as well as to identify any inconsistencies between found tokens.

The artifact token processing module 415 may contain an interaction processing module 421 to process tokens that are generated when processing passes from one processing module within either the client 103 or the server 102 to a second processing module. Similarly, the artifact token processing module 415 may contain an multi-layer token processing module 422 to process tokens that are generated when processing passes from one layer within either the client 103 or the server 102 to a second layer. All tokens found and processed within these modules are ultimately stored for later use in the repository 112. For example, while parsing a database object, say a stored procedure belonging to one function f1 calls another stored procedure belonging to a different function f2, this call is triggered as an interaction point between these two functions f1 and f2.

Figure 5:
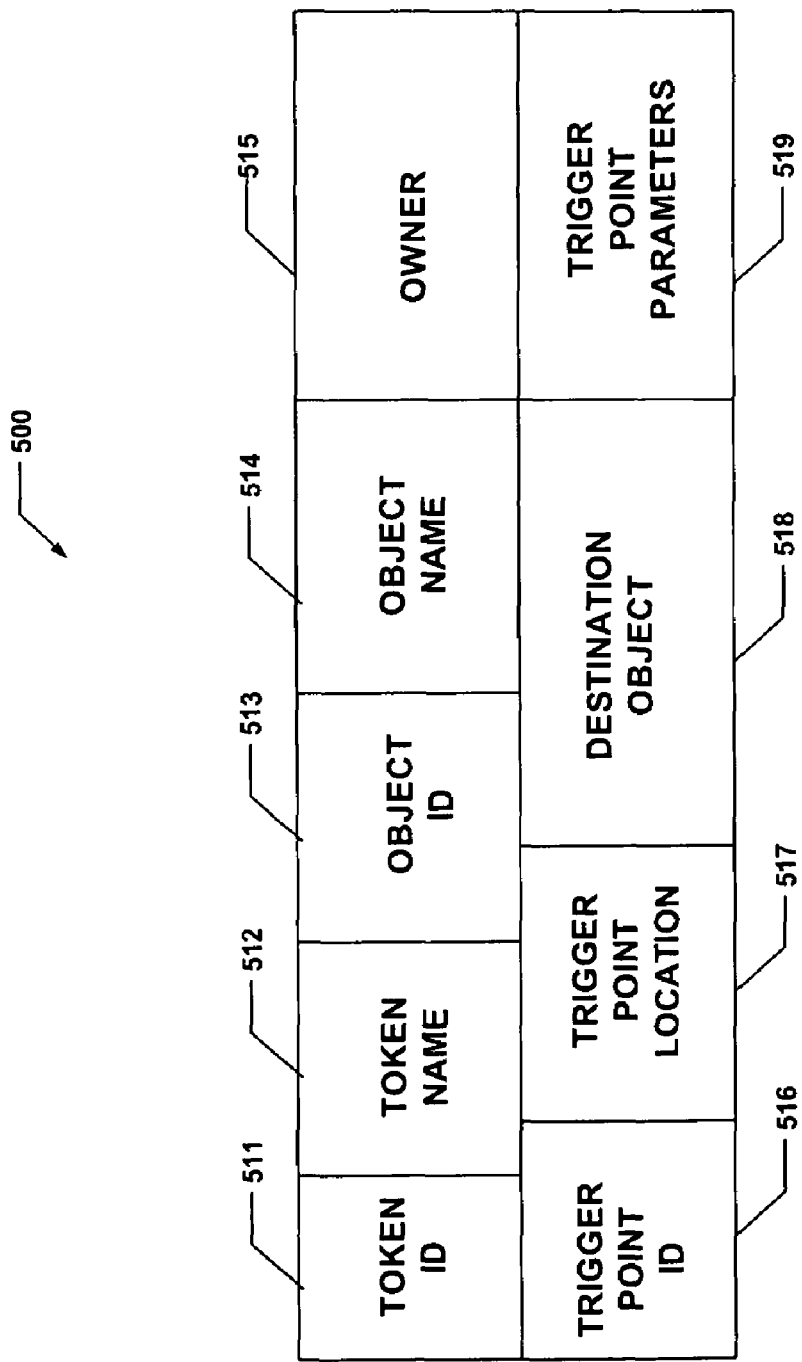
FIG. 5 is a diagram of a token entry from an interaction token repository according to an exemplary embodiment of the present invention.

FIG. 5 is a diagram of a token entry from an interaction token repository according to an exemplary embodiment of the present invention. As noted above, a token 500 is used to define trigger points that occur when processing passes from one processing object to another. These tokens 500 contain data fields that define the state and nature of the processing transfer between these objects. The token fields may include a token ID 511, a token name 512, an object ID 513, an object name 514, an owner 515, trigger point ID 516, a trigger point location 517, destination object 518, and trigger point parameters 519. The token ID 511 and the token name 512 are used to define the particular token contained within token 500 when it is stored in repository 112. The token ID 511 provides a unique identifier for the token as compared to the token name 512 which is typically a human-readable identifier for the token.

The object ID 513 and an object name 514 provide a unique identifier and a human-readable name for the processing object in which a trigger point for possible transfer of control to a different object occurs. The owner field 515 identifies any owner for the object in which the trigger point occurs that may be used in defining the granularity of the modules being analyzed. The trigger point ID 516 and the trigger point location 517 provide a unique identify for the location of the trigger point within the object identified by object ID 513. The destination object 518 identifies the software object to which processing may pass if conditions of the trigger point indicate that processing is to flow between software objects.

Finally, trigger point parameters 519 contain one or more parameters to define any data, state conditions, and other processing information needed to characterize the trigger point, the data passing between software objects and similar information needed to analyze the code. All of this information is stored within token 500 which is maintained within the repository 112 for use as needed.

Figure 6:
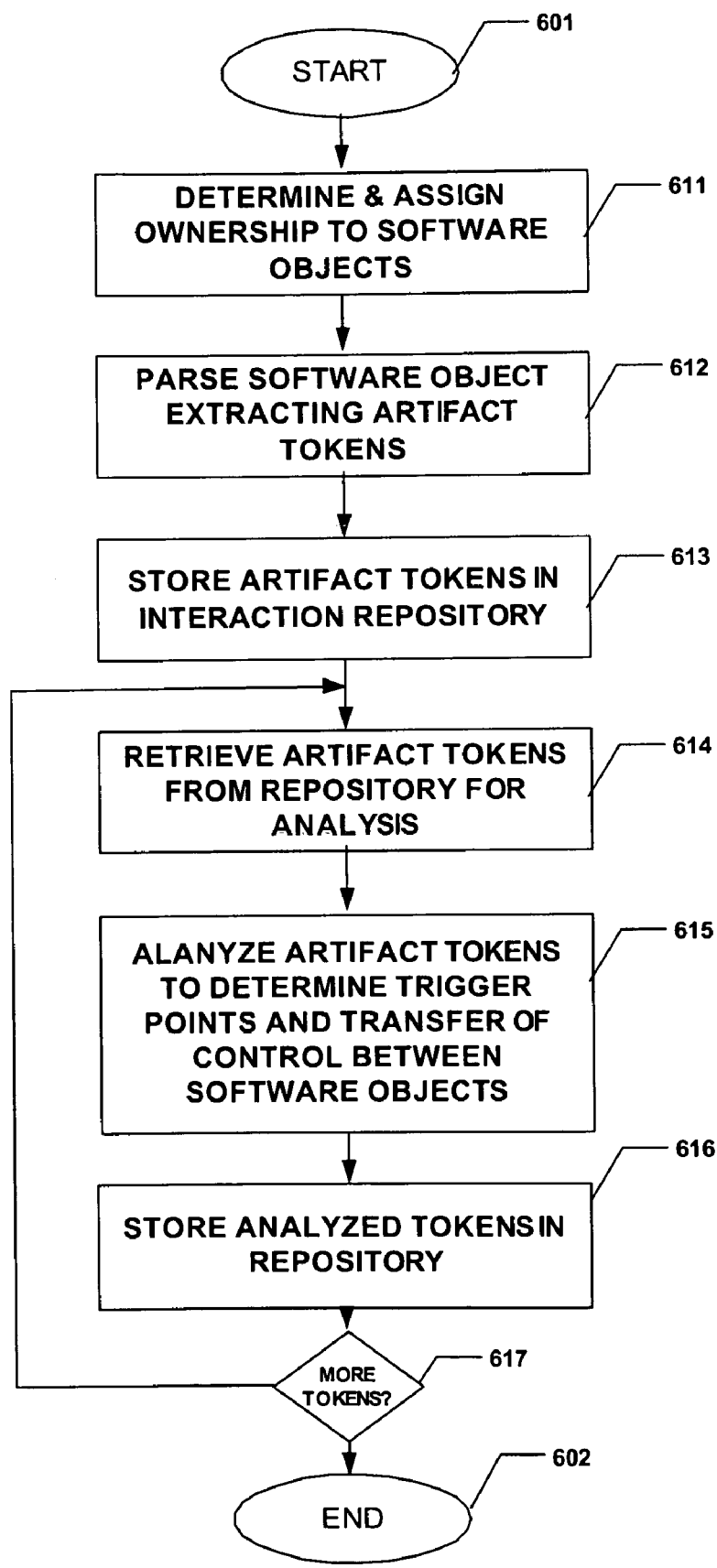
FIG. 6 is a flow diagram of a software development of a artifact analyzer module operation according to an exemplary embodiment of the present invention.

FIG. 6 is a flow diagram of a software development of an artifact analyzer module operation according to an exemplary embodiment of the present invention. The processing within the artifact analyzer module 111 begins 601 and ownership of every software object within an application is determined and assigned within operation 611. The ownership characteristic is used to define the granularity of any analysis being performed within a large enterprise application.

Once ownership of the software objects is determined, software module code may be parsed within operation 612 to extract tokens. In order to extract these tokens, trigger points between software objects are identified in the parsed code. Parameter data and related information related to the trigger point is collected to define the trigger point. The token 500 is stored within interaction repository 112 for storage and later use within operation 613.

With the tokens stored within the repository, tokens 500 may be retrieved from the repository 112 in operation 614 and compared within each other in operation 615 to identify whether the interactions between these modules contain any errors or inconsistencies in the data and related interaction. Tokens typically define when processing control leaves an object to pass to another object. These tokens may be checked to see that objects receiving the control, receives parameters needed to continue processing. When the analysis is performed after one of the objects associated with the token have been modified, the token may be checked to verify that the needed data and related state information is present and in a proper form given any modifications made to the objects.

Any data from these analyzed tokens and trigger points may be stored within the repository 112 in operation 616 for use in any future analysis. The processing may continue with test operation 617 determining if additional tokens are to be processed. If so, processing returns to operation 614 and repeats the analysis operations. Otherwise the processing ends 602.

Thus, a method and system to analyze interactions among software artifacts have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for analyzing interactions among software artifacts within enterprise business applications, wherein the enterprise business application comprises a server enterprise application executing on a server processing system and a client enterprise application executing on a client processing system, and wherein the server processing system and the client processing system comprises a processor and a memory, the system comprising:
    an artifact analyzer module, residing in the server processing system or in the client processing system or both, configured to extract interactions of software artifacts within enterprise business applications; the artifact analyzer module comprising:
        an artifact code parsing module for parsing software code for software objects in the enterprise business application; and
        an artifact token processing module for extracting artifact tokens associated with trigger points in which processing control passes between a first software object and a second software object using the parsed software code in the enterprise business application, and wherein the artifact token processing module comprises:
            an interaction token processing module for generating and analyzing tokens associated with software objects on different processing systems; and
            a multi-layer token processing module for generating and analyzing tokens associated with software objects within a multi-layer application architecture; and
    an interaction token repository for storing the artifact tokens, wherein the artifact tokens describe identity of the first software object, ownership of the first software object containing the trigger point, a location within first software object of the trigger point, and identity of the second software object.

2. The system according to claim 1, wherein the artifact token further describes trigger point parameter data to define any data, state conditions, and other processing information needed to characterize the trigger point.

3. The system according to claim 1, wherein the artifact code parsing module receives source code from a software development system for processing and analysis of artifact token data.

4. The system according to claim 3, wherein the software development system is an external software development system.

5. The system according to claim 3, wherein the artifact analyzer module is part of the software development system.

6. The system according to claim 1, wherein the server enterprise application comprises a multi-layer application having a server presentation layer, a server services layer, a server methods layer and a server database layer.

7. The system according to claim 6, wherein the layers of the server enterprise application interact with corresponding layers of the client enterprise application.

8. The system according to claim 1, wherein the client enterprise application comprises a multi-layer application having a client presentation layer, a client services layer, a client methods layer and a client database layer.

9. A method for analyzing interactions among software artifacts within enterprise business applications, wherein the enterprise business application comprises: a server enterprise application executing on a server processing system and a client enterprise application executing on a client processing system, the method comprising:
    assigning an ownership function for every software object within the enterprise application;
    parsing software code for software objects in the enterprise application;
    extracting artifact tokens associated with trigger points in which processing control passes between a first software object and a second software object using the parsed code in the enterprise business application, and wherein the extracting of artifact tokens comprises an interaction token processing module and a multi-layer token processing module for generating and analyzing tokens associated with software objects on different processing systems and within a multi-layer application architecture, respectively;
    storing the artifact tokens within an interaction artifact repository; and
    analyzing interaction between the first and second software object using the artifact tokens and the assigned ownership function;
    wherein the artifact tokens describe identity of the first software object, ownership of the first software object containing the trigger point, a location within first software object of the trigger point, and identity of the second software object.

10. The method according to claim 9, wherein the method further comprises storing artifact tokens within an interaction artifact repository.

11. The method according to claim 9, wherein the artifact token further describes trigger point parameter data to define any data, state conditions, and other processing information needed to characterize the trigger point.

12. The method according to claim 9, wherein the method further comprises receiving the software from a software development system for processing and analysis of artifact token data.

13. The method according to claim 12, wherein the software development system is an external software development system.

14. The method according to claim 9, wherein the server enterprise application comprises a multi-layer application having a server presentation layer, a server services layer, a server methods layer and a server database layer.

15. The method according to claim 9, wherein the client enterprise application comprises a multi-layer application having a client presentation layer, a client services layer, a client methods layer and a client database layer.

16. The method according to claim 15, wherein the layers of the server enterprise application interact with corresponding layers of the client enterprise application.

17. An article comprising:
    a storage medium having instructions that when executed by a computing platform, result in execution of a method for analyzing interactions among software artifacts within enterprise business applications, wherein the enterprise business application comprises: a server enterprise application executing on a server processing system and a client enterprise application executing on a client processing system, the method comprising:

receiving the software from a software development system for processing and analysis of artifact token data;

assigning for every software object within the enterprise application;

parsing software code for software objects in the enterprise application;

extracting artifact tokens associated with trigger points in which processing control passes between a first software object and a second software object using the parsed code in the enterprise business application, wherein the extracting of artifact tokens comprises an interaction token processing module and a multi-layer token processing module for generating and analyzing tokens associated with software objects on different processing systems and within a multi-layer application architecture, respectively;

storing the artifact tokens within an interaction artifact repository;

analyzing interaction between the first and second software object using the artifact tokens and the assigned ownership function; and wherein the artifact tokens describe identity of the first software object, ownership of the first software object containing the trigger point, a location within first software object of the trigger point, and identity of the second software object.

18. The article according to claim 17, wherein the artifact token further describes trigger point parameter data to define any data, state conditions, and other processing information needed to characterize the trigger point.

19. The article according to claim 17, wherein the software development system is an external software development system.

20. The article according to claim 17, wherein the server enterprise application comprises a multi-layer application having a server presentation layer, a server services layer, a server methods layer and a server database layer.

21. The article according to claim 20, wherein the layers of the server enterprise application interact with corresponding layers of the client enterprise application.

22. The article according to claim 17, wherein the client enterprise application comprises a multi-layer application having a client presentation layer, a client services layer, a client methods layer and a client database layer.

* * * * *